(12) United States Patent
Ikawa et al.

(10) Patent No.: US 10,414,292 B2
(45) Date of Patent: Sep. 17, 2019

(54) VEHICLE SEAT ATTACHED TO FLOOR OF VEHICLE VIA RAIL DEVICE AND COUPLING DEVICE

(71) Applicant: TS TECH CO., LTD., Saitama (JP)

(72) Inventors: Haruki Ikawa, Tochigi (JP); Yasutaka Abe, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 15/935,192

(22) Filed: Mar. 26, 2018

(65) Prior Publication Data

US 2018/0281628 A1    Oct. 4, 2018

(30) Foreign Application Priority Data

Mar. 30, 2017 (JP) ................................. 2017-068898

(51) Int. Cl.
*B60N 2/08* (2006.01)

(52) U.S. Cl.
CPC ........... *B60N 2/0825* (2013.01); *B60N 2/085* (2013.01)

(58) Field of Classification Search
CPC .............................. B60N 2/0825; B60N 2/085
USPC ............................ 297/344.1, 326; 296/65.05
See application file for complete search history.

(56) References Cited

U.S. PATENT DOCUMENTS

| | | | | |
|---|---|---|---|---|
| 5,662,368 | A * | 9/1997 | Ito | ...................... B60N 2/01583 296/65.05 |
| 7,854,462 | B2 * | 12/2010 | Scholl | .................. B60N 2/3011 296/65.09 |
| 2009/0322115 | A1 * | 12/2009 | Yamada | ................... B60N 2/06 296/65.08 |

FOREIGN PATENT DOCUMENTS

JP        2005053246        3/2005

* cited by examiner

*Primary Examiner* — Milton Nelson, Jr.
(74) *Attorney, Agent, or Firm* — Dority & Manning, P.A.

(57) ABSTRACT

Provided is a vehicle seat which is attached to a floor of a vehicle via a rail device and a coupling device with a high level of stiffness so as to minimize deformation of the rail device and the coupling device without substantially increasing the weight and the manufacturing cost of the seat. The vehicle seat is provided with an upper engagement portion secured to a member on a side of an upper rail of the rail device, and a lower engagement portion secured to a member on a side of a lower rail of the rail device and including a part opposing a corresponding part of the upper engagement portion from above defining a prescribed gap therebetween. The coupling device is provided laterally spaced from the rail device, and the upper engagement portion and the lower engagement portion are provided substantially directly above the coupling device.

9 Claims, 5 Drawing Sheets

VEHICLE SEAT ATTACHED TO FLOOR OF VEHICLE VIA RAIL DEVICE AND COUPLING DEVICE

TECHNICAL FIELD

The present invention relates to a vehicle seat.

BACKGROUND ART

A known vehicle seat comprises a lower rail having a front end pivotally attached to a floor of the vehicle, an upper rail slidably engaged by the lower rail and fixedly secured to a seat cushion frame, and a coupling device provided on a rear end of the lower rail and configured to detachably engage a striker fixedly secured to the floor. See JP2005-53246A, for instance. This vehicle can be pivoted between a use position and a storage position around the front end of the lower rail once the striker is released from the coupling device.

In such a seat, to minimize deformation of the rail device and the coupling device under the inertia force created at the time of a vehicle crash, the rail device and the coupling device are required to be built with a high level of stiffness. Therefore, the weight and the manufacturing cost of the seat inevitably increase.

SUMMARY OF THE INVENTION

In view of such a problem of the prior art, a primary object of the present invention is to provide a vehicle seat which is attached to a floor of a vehicle via a rail device and a coupling device with a high level of stiffness so as to minimize deformation of the rail device and the coupling device without substantially increasing the weight and the manufacturing cost of the seat.

To achieve such an object, one aspect of the present invention provides a vehicle seat (1), comprising: a skeletal cushion frame (5) for a seat cushion (3); a rail device (33) including an upper rail (36) secured to the cushion frame and extending in a fore and aft direction and a lower rail (35) slidably engaging with the upper rail; a coupling device (50) provided on the lower rail to detachably engage a striker (80) provided on a floor (F) of a vehicle; an upper engagement portion (75C, 76C) secured to a member on a side of the upper rail; and a lower engagement portion (42C, 71B) secured to a member on a side of the lower rail and including a part opposing a corresponding part of the upper engagement portion from above defining a prescribed gap therebetween; wherein the coupling device is provided laterally spaced from the rail device, and the upper engagement portion and the lower engagement portion are provided substantially directly above the coupling device.

At the time of a vehicle crash, a vehicle seat receives an upward inertial force. Owing to the features of the present invention specified above, at such a time, the upper engagement portion and the lower engagement portion engage each other so that the rail device is prevented from receiving excessive load, and is protected from excessive deformation. Under normal conditions, owing to a gap defined between the upper engagement portion and the lower engagement portion, no frictional resistance is applied to the movement of the rail device. In particular, because the upper engagement portion and the lower engagement portion are provided substantially directly above the coupling device, the loading applied to the vehicle seat is linearly transmitted to the striker fixedly secured to the floor, and substantially no bending moment is applied to the rail device. Therefore, the rail device is favorably protected in a vehicle crash situation.

According to a preferred embodiment of the present invention, the cushion frame comprises a plurality of longitudinal members (11, 15) extending in the fore and aft direction and a plurality of cross members (13, 16) extending laterally between the longitudinal members, and the upper engagement portion is provided in a lower part of an upper engagement member (75, 76) elongated in the fore and aft direction and secured to two of the cross members.

Because the upper engagement portion is formed in the upper engagement member secured to the cross members of the cushion frame, the stiffness of the upper engagement portion is maximized. Because the loading applied to the upper engagement portion can be directly transmitted to the cushion frame, the rail device is favorably protected from undue loading.

Preferably, the vehicle seat further comprises a supporting plate (42) including a lower wall (42A) attached to a bottom wall (35A) of the lower rail and a side wall (42B) extending upward from a side edge of the lower wall, wherein the coupling device is attached to the side wall, and the lower engagement portion is formed in an upper edge of the side wall.

Thus, because the lower engagement portion is located nearer to the coupling device than to the lower rail, the loading applied to the lower engagement portion is transmitted to the floor via the coupling device, instead of the rail device, and therefore, the deformation of the rail device is minimized.

In this arrangement, preferably, the vehicle seat further comprises an additional plate (71) attached to the supporting plate and having an upper edge laterally spaced from the upper edge of the side wall of the supporting plate, wherein the upper engagement portion (75C, 76C) is formed on either side of the lower part of the upper engagement member, and the lower engagement portion (42C, 71B) is formed in each of an upper edge of the supporting plate and an upper edge of the additional plate.

Because two sets of engagement arrangements are provided, one set consisting of the first upper engagement portion and the first lower engagement portion and the other set consisting of the second upper engagement portion and the second lower engagement portion, the vehicle seat is able to withstand a very high loading without causing any undue deformation in the rail device.

In this arrangement, preferably, the additional plate is secured to a cover plate (52) of a casing covering the coupling device.

The loading applied to one of the lower engagement portions is transmitted to the coupling device via the additional plate so that the lower rail is protected from undue loading in an even more effective manner.

Preferably, the upper engagement member includes a pair of sheet members each including a vertical wall laid over the vertical wall of the other sheet member, and an upper flange bent from an upper edge of the vertical wall away from the other sheet member, the upper engagement portions being formed by upwardly bending lower edges of the vertical walls.

Thereby, the engagement arrangements are enabled to withstand a high load in a stable manner. The vertical walls of the two sheet members may be welded to each other for an even higher mechanical stability.

Preferably, the upper engagement portion and the lower engagement portion are elongated in the fore and aft direction.

Thereby, the upper engagement portion and the lower engagement portion can engage each other without regard to the relative position between the upper rail and the lower rail of the rail device.

Each of the upper engagement portion and the lower engagement portion is preferably provided with a shape of letter J in front view.

Thereby, the upper engagement portion and the lower engagement portion can engage each other in a reliable manner.

Thus, one aspect of the present invention provides a vehicle seat which is attached to a floor of a vehicle via a rail device and a coupling device with a high level of stiffness so as to minimize deformation of the rail device and the coupling device without substantially increasing the weight and the manufacturing cost of the seat even at the time of a severe vehicle crash.

BRIEF DESCRIPTION OF THE DRAWING(S)

DESCRIPTION OF THE PREFERRED EMBODIMENT(S)

A vehicle rear seat (which may be a second row seat or a third row seat) according to an embodiment of the present invention is described in the following with reference to the appended drawings. The seat is configured to change the state and the position thereof between a use position (seating position) and a storage position, and the following description is based on the use position of the vehicle seat unless otherwise specified.

Figure 1:
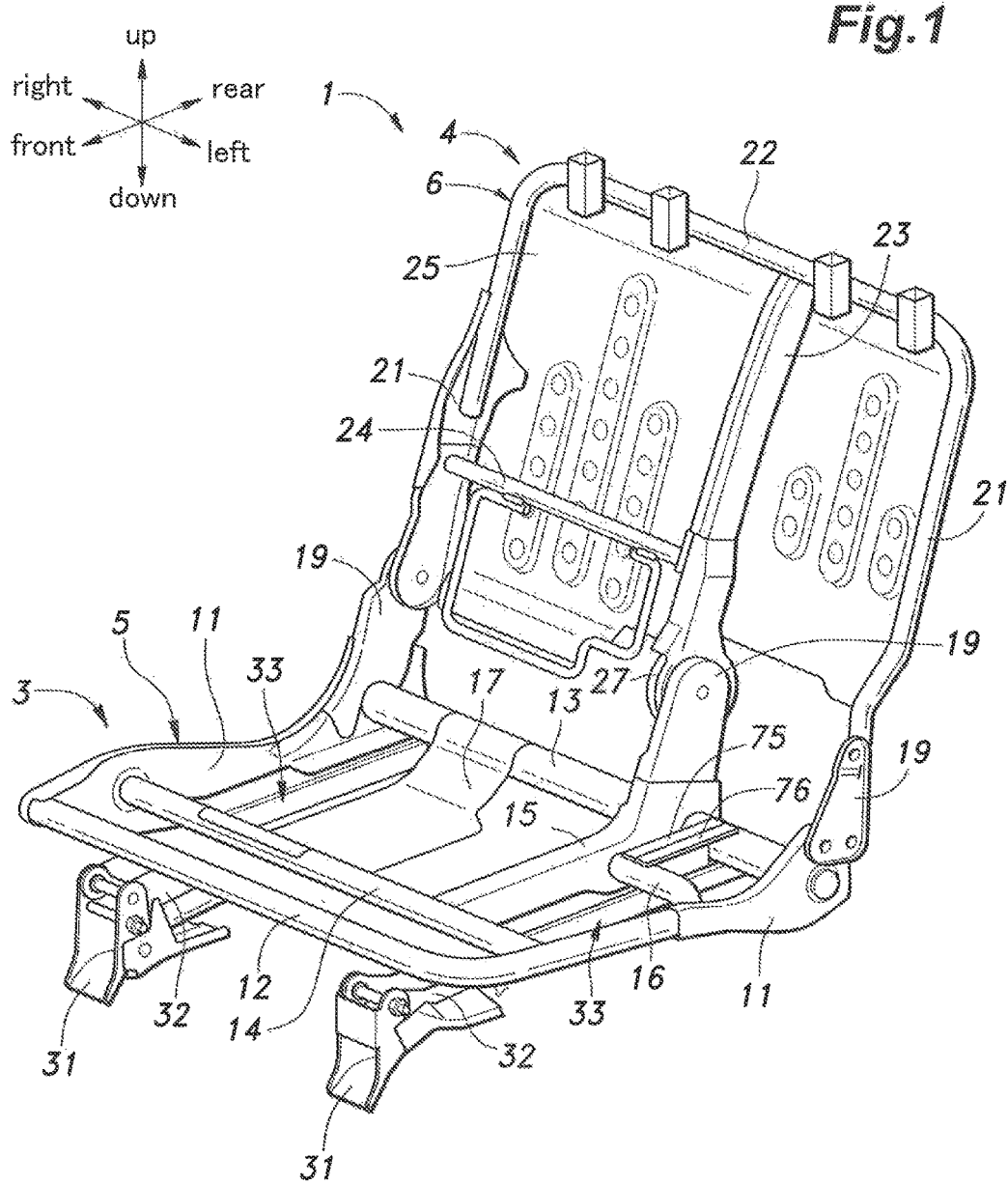
FIG. 1 is a perspective view of a frame structure of a vehicle seat embodying the present invention as viewed from a front left direction.

As shown in FIG. 1, the seat 1 serves as the right seat and the center seat of the second row seat or the third row seat of a motor vehicle. The seat 1 includes a seat cushion 3 rotatably provided on a floor F of the vehicle and a seat back 4 rotatably supported by the seat cushion 3. The seat cushion 3 and the seat back 4 are provided with a seat cushion frame 5 and a seat back frame 6, respectively, as a skeletal frame. The seat cushion 3 and the seat back 4 are provided with pads (not shown in the drawings) supported by the seat cushion frame 5 and the seat back frame 6, respectively, and a skin material (not shown in the drawings) covers each pad.

The seat cushion frame 5 is formed by combining longitudinal members extending in the fore and aft direction, and cross members extending in the lateral direction. More specifically, the seat cushion frame 5 includes a pair of cushion side frames 11 (longitudinal members) extending in the fore and aft direction on either side, a front member 12 extending laterally, and connected to the front ends of the cushion side frames 11 at the respected lateral ends thereof, and a rear member 13 extending laterally, and connected to the rear ends of the cushion side frames 11 at the respected lateral ends thereof, and is thus provided with a rectangular frame structure. The seat cushion frame 5 further includes a first intermediate member 14 extending laterally, and connected to intermediate parts of the cushion side frames 11 at the respective lateral ends thereof, an intermediate frame 15 (fore and aft member) extending in the fore and aft direction, and having a front end connected to an intermediate part of the first intermediate member 14 and a rear end connected to an intermediate part of the rear member 13, and a second intermediate member 16 extending laterally, and having a left end connected to an intermediate part of the left cushion side frame 11 and a right end connected to an intermediate part of the intermediate frame 15. The seat cushion frame 5 additionally includes a pan frame 17 extending in the fore and aft direction, and has front end connected to a part of the first intermediate member 14 intermediate between the right cushion side frame 11 and the intermediate frame 15, and a rear end connected to a part of the rear member intermediate between the right cushion side frame 11 and the intermediate frame 15.

The front member 12, the first intermediate member 14, the second intermediate member 16, the rear member 13, and the cushion side frames 11 are generally made of metal pipe. The front member 12, a front part of the left cushion side frame 11, and the second intermediate member 16 are formed by bending a single pipe of metal pipe. The right cushion side frame 11, the intermediate frame 15, and a rear part of the left cushion side frame 11 are formed by sheet metal members each having a major plane facing sideways. The various members forming the seat cushion frame 5 are connected to one another by welding.

The rear ends of the cushion side frames 11 and the rear end of the intermediate frame 15 are respectively provided with seat back supporting portions 19 projecting substantially upward.

The seat back frame 6 includes a pair of back side frames 21 extending substantially in the vertical direction on either side, an upper member 22 extending laterally and connected to the upper ends of the back side frames 21 at two ends thereof, a back intermediate frame 23 extending substantially vertically between the back side frames 21 and having an upper end connected to an intermediate part of the upper member 22, a lower member 24 extending laterally and having a right end connected to a lower part of the right back side frame 21 and a left end connected to a lower part of the intermediate frame 15. A back pan frame 25 consisting of a plate member is attached to the back side frames 21, the back intermediate frame 23, the upper member 22, and the lower member 24 from the back side.

The lower ends of the back side frames 21 and the back intermediate frame 23 are supported by the seat back supporting portions 19 of the cushion side frames 11 and the intermediate frame 15, respectively, so as to be rotatable around a common laterally extending axial line. A reclining mechanism 27 is provided between the lower end of the back intermediate frame 23 and the seat back supporting portion 19 of the intermediate frame 15 for fixing the position of the back intermediate frame 23 with respect to the seat back supporting portion 19 at a desired angle. The reclining mechanism 27 selectively permits the rotation of the back intermediate frame 23 with respect to the seat back supporting portion 19 in response to a user's manual operation. The reclining mechanism 27 can fix the position of the back intermediate frame 23 with respect to the seat back supporting portion 19 at least between the storage position and the use position.

The seat cushion frame 5 includes a pair of support members 31 attached to the floor F of the vehicle, and a pair of pivot members 32 which are pivotally coupled to the respective pivot members 32 around a laterally extending axial line, and are connected to the right cushion side frame 11 and the intermediate frame 15, respectively.

Figure 3:
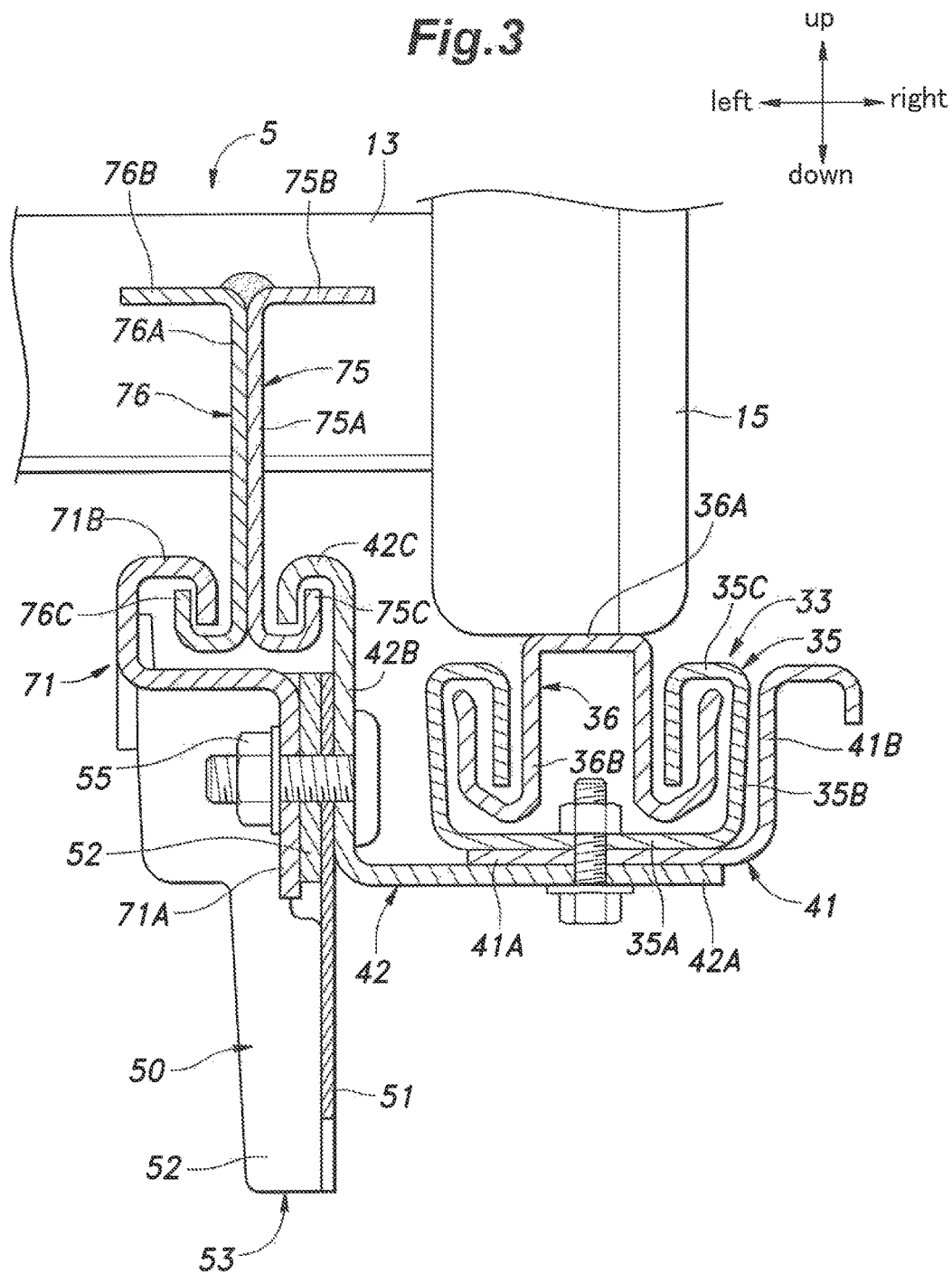
FIG. 3 is a sectional view taken along line III-III of FIG. 2.

As shown in FIGS. 1 and 3, each rail device 33 includes a lower rail 35 extending in the fore and aft direction, an upper rail 36 engaged by the lower rail 35 so as to be slidable in the fore and aft direction, and a rail locking device (not shown) for selectively locking the upper rail 36 at a desired position relative to the lower rail 35. The lower rail 35 includes a bottom wall 35A having a major plane facing vertically and extending in the fore and aft direction, a pair of side walls 35B extending upward from either lateral edge of the bottom wall 35A at a substantially right angle, and a pair of upper walls 35C extending toward each other from the upper edges of the respective side walls 35B at a right angle. The mutually opposing edges of the upper walls 35C are bent downward. The upper rail 36 includes a base portion 36A attached to the right cushion side frame 11 or the intermediate frame 15, and a pair of legs 36B that extend downward from either side edge of the base portion 36A. The lower edges of the legs 36B are bent away from each other and upward toward the lower surface of the respective upper walls 35C of the lower rail 35. Although not shown in the drawings, a plurality of steel balls are interposed in the gaps between the upper rail 36 and the lower rail 35 for a relatively frictionless movement between the upper rail 36 and the lower rail 35.

As shown in FIG. 1, the front ends of the lower rails 35 of the rail devices 33 are coupled to the respective pivot members 32. The upper rail 36 of the left rail device 33 is coupled to the bottom of the intermediate frame 15 at the upper end thereof, and the upper rail 36 of the right rail device 33 is coupled to the bottom of the right cushion side frame 11 at the upper end thereof.

Figure 4:
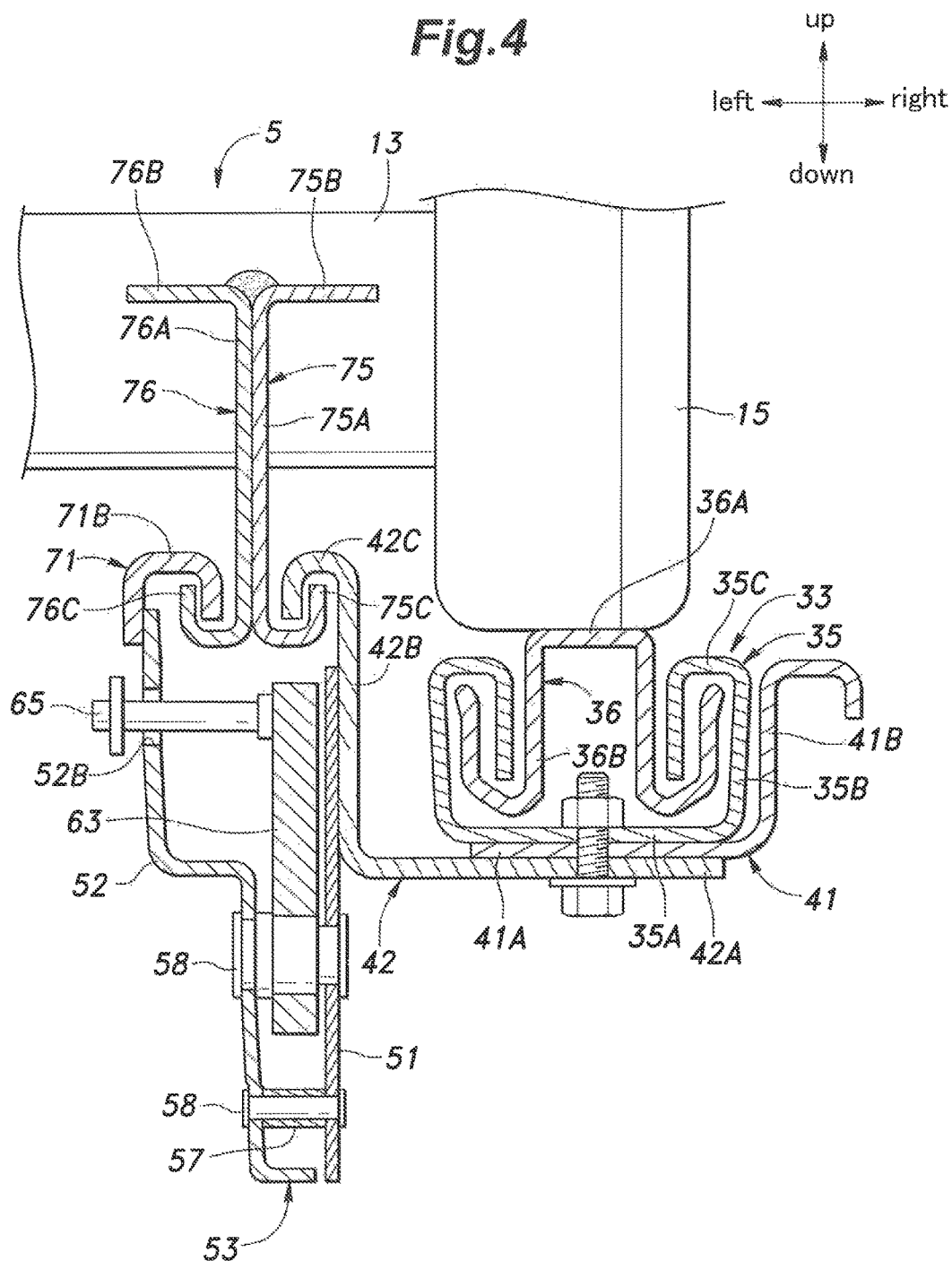
FIG. 4 is a sectional view taken along line IV-IV of FIG. 2.

As shown in FIGS. 3 and 4, a reinforcing plate 41 and a supporting plate 42, both consisting of sheet metal members, are attached to the bottom wall 35A of a rear end part of the left lower rail 35. The reinforcing plate 41 includes a lower wall 41A extending in the fore and aft direction under the bottom wall 35A of the lower rail 35, and a side wall 41B extending upward from the right side edge of the lower wall 41A and along the length of the bottom wall 35A so that an L-shaped cross section is defined. The supporting plate 42 includes a lower wall 42A extending in the fore and aft direction under the lower wall 41A of the reinforcing plate 41, and a side wall 42B extending upward from the left side edge of the lower wall 42A and along the length of the lower wall 41A of the reinforcing plate 41 so that an L-shaped cross section is defined. The lower wall 41A of the reinforcing plate 41 and the lower wall 42A of the supporting plate 42 are jointly attached to the bottom wall 35A of the left lower rail 35 with a fastening member such as bolts and nuts, and rivets. In an alternate embodiment, the reinforcing plate 41 is omitted, and the supporting plate 42 is directly attached to the lower rail 35.

Figure 2:
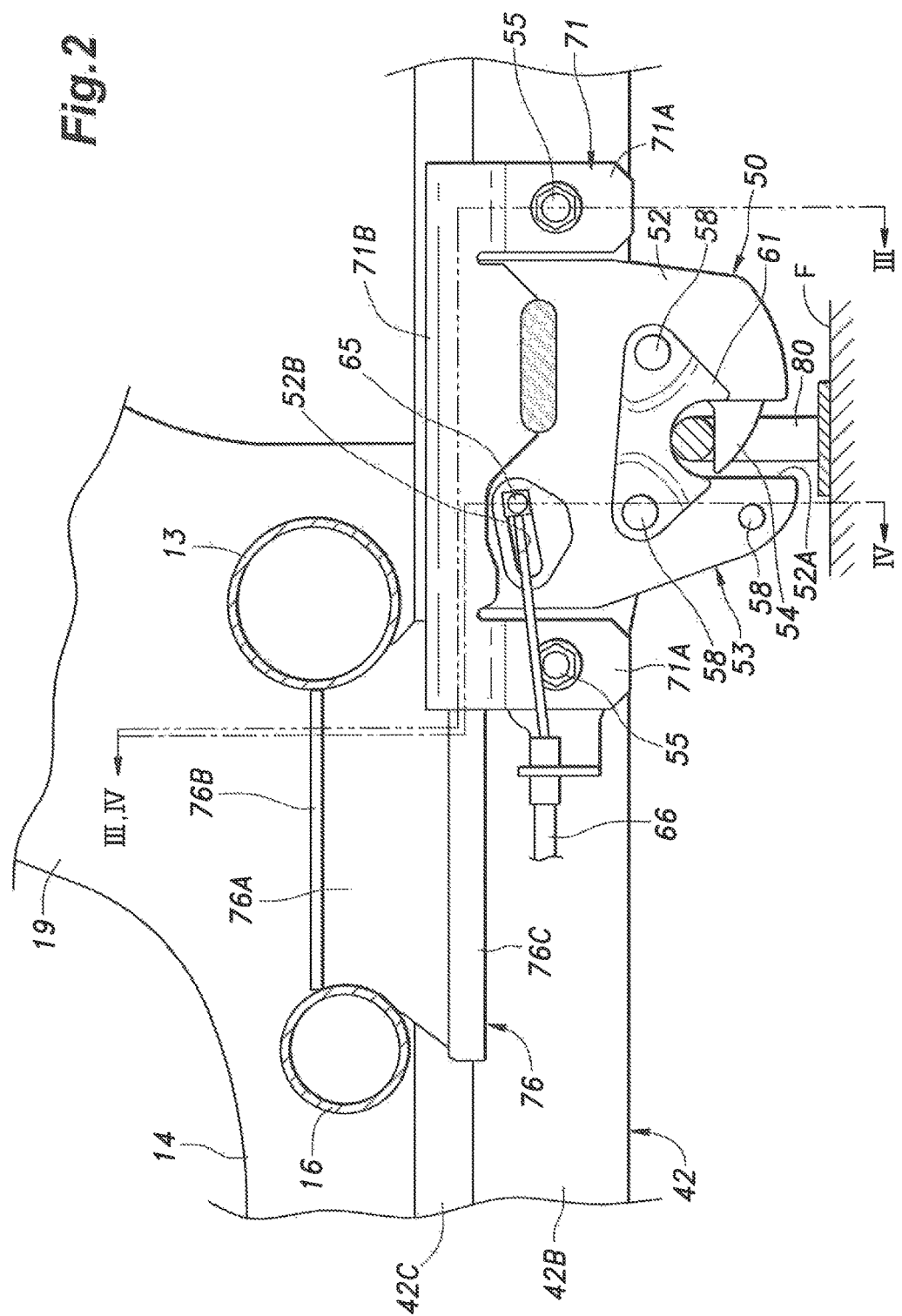
FIG. 2 is a side view of a coupling device.

As shown in FIGS. 2 to 4, a coupling device 50 is provided in a rear part of the side wall 42B of the supporting plate 42. The coupling device 50 includes a casing 53 composed of a base plate 51 and a cover plate 52 both consisting of sheet metal members, and a hook-shaped latch 54 rotatably supported by the casing 53. The base plate 51 and the cover plate 52 are arranged so that the major planes thereof laterally oppose each other. The cover plate 52 is fastened to the base plate 51 by fastening members 58 at the front and rear ends thereof, and an intermediate part thereof with respect to the fore and aft direction is spaced apart from the base plate 51. Therefore, an internal space 56 is defined between the base plate 51 and the cover plate 52 in an intermediate part of the casing 53 with respect to the fore and aft direction. In particular, one of the fastening members 58 is provided with a spacer 57 to maintain the internal space in a mechanically stable manner. The fastening members 58 may consist of bolts and nuts, rivets or the like.

As shown in FIGS. 2 to 5, the lower edge of the cover plate 52 is bent toward the base plate 51 so that the lower end of the internal space 56 is substantially closed except for a central slot 49 which is jointly formed by slots 51A and 52A extending vertically in the base plate 51 and the cover plate 52 from the respective lower edges thereof. The slots 51A and 52A are conformal and align to each other in side view.

As shown in FIG. 2, a cushioning material holder 61 is provided on the outer side surface of the cover plate 52 immediately above the slot 52A, and a cushioning material (not shown in the drawings) such as rubber is supported by the cushioning material holder 61. The cushioning material holder 61 extends in the fore and aft direction above the slot 52A, and is fastened to the outer surface of the cover plate 52 by two of the fastening members 58 at the front end rear ends thereof. The cushioning material extends to the upper end of the slot 52A.

Figure 5:
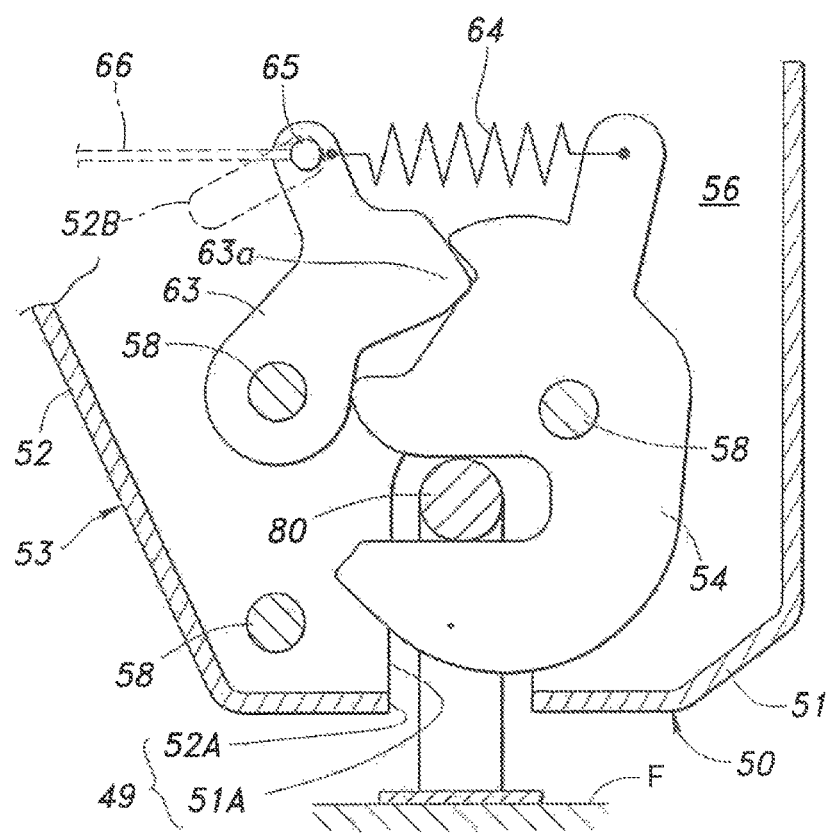
FIG. 5 is a sectional view showing an internal structure of the coupling device.

As shown in FIGS. 4 and 5, the latch 54 is provided in the internal space 56 between the base plate 51 and the cover plate 52. The latch 54 is supported by one of the fastening members 58 so as to be rotatable around a lateral axial line between a lock position protruding into the slot 49 and a release position withdrawn from the slot 49. A lock piece 63 is supported by another one of the fastening members 58 so as to be rotatable around a lateral axial line between a first position at which the lock piece 63 prevents the rotation of the latch 54 from the lock position to the release position, and a second position at which the lock piece 63 is spaced away from the latch 54 and permits the rotation of the latch 54. The latch 54 and the lock piece 63 are connected to each other by a biasing member 64 such as a tension coil spring so that the lock piece 63 is urged toward the first position and the latch 54 is urged toward the lock position. In particular, the latch 54 is provided with a cam surface on which a nose 63a provided in the lock piece 63 abuts so that the latch 54 may be pushed by the lock piece 63 from the release position to the lock position as will be described hereinafter.

As shown in FIGS. 2 and 4, a free end part of the lock piece 63 is provided with a coupling pin 65 that passes through an arcuate slot 52B formed in the cover plate 52 and protrudes outward from the cover plate 52. One end of a control cable 66 is coupled to the outer end of the coupling pin 65. When the control cable 66 is pulled, the lock piece 63 moves from the first position to the second position, and the latch 54 is cause to move from the lock position to the release position under the biasing force of the biasing member 64.

As shown in FIGS. 2 to 4, the upper edge of the side wall 42B of the supporting plate 42 is bent away from the lower rail 35, and then downwardly so as to define a J-shaped first lower engagement portion 42C. The supporting plate 42 functions as a first lower engagement member provided with the first lower engagement portion 42C.

An additional plate 71 is attached to the upper part of the outer surface (facing away from the supporting plate 42) of the cover plate 52, and extends in the fore and aft direction along the upper edge of the cover plate 52. A pair of coupling pieces 71A extend downward from the front and rear ends of the additional plate 7, and are attached to the supporting plate 42 jointly with the cover plate 52 and the base plate 51 by respective fastening members 55. The additional plate 71 is also welded to the cover plate 52 in appropriate parts thereof. In another embodiment, the cover plate 52 and the additional plate 71 are formed by a single piece of plate.

The coupling pieces 71A are offset toward the base plate 51 relative to the upper end part of the additional plate 71 in front view. The upper edge of the additional plate 71 is bent toward the first lower engagement portion 42C and then downwardly so as to define a J-shaped second lower engagement portion 71B. The additional plate 71 functions as a second lower engagement member provided with the second lower engagement portion 71B.

The first lower engagement portion 42C and the second lower engagement portion 71B are arranged next to each other in the lateral direction, and extend in parallel to each other in the fore and aft direction.

As shown in FIGS. 1 to 3, a first upper engagement member 75 and a second upper engagement member 76 are connected between the second intermediate member 16 and the rear member 13. The first upper engagement member 75 and the second upper engagement member 76 both consist of sheet metal members, and are configured in a mutually symmetric manner in front view. More specifically, the first upper engagement member 75 is provided with a vertical wall 75A having a laterally facing major plane, an upper flange 75B bent from the upper edge of the vertical wall 75A away from the second upper engagement member 76, and a first upper engagement portion 75C bent from a lower edge of the vertical wall 75A in a shape of letter J away from the second upper engagement member 76. Similarly, the second upper engagement member 76 is provided with a vertical wall 76A having a laterally facing major plane, an upper flange 76B bent from the upper edge of the vertical wall 76A away from the first upper engagement member 75, and a second upper engagement portion 76C bent from the lower edge of the vertical wall 76A in a shape of letter J away from the first upper engagement member 75. The vertical walls 75A and 76A and the upper flanges 75B and 76B of the first upper engagement member 75 and the second upper engagement member 76 are attached to the second intermediate member 16 at the front ends thereof and attached to the rear member 13 at the rears thereof. The vertical walls 75A and 76A of the first upper engagement member 75 and the second upper engagement member 76 are welded to each other.

The first lower engagement portion 42C and the first upper engagement portion 75C are in an interlocking and spaced apart relationship so that the two portions can move freely relative to each other in the fore and aft direction, but are prevented from moving vertically and laterally away from each other beyond a small gap defined therebetween. Similarly, the second lower engagement portion 71B and the first upper engagement portion 75C are in an interlocking and spaced apart relationship so that the two portions can move freely relative to each other in the fore and aft direction, but are prevented from moving vertically away and laterally away from each other beyond a small gap defined therebetween.

The first lower engagement portion 42C, the first upper engagement portion 75C, the second lower engagement portion 71B and the second upper engagement portion 76C are all located directly above the coupling device 50, and next to the inboard side of the rail device 33 provided on the intermediate frame 15.

A coupling device 50 similar to the coupling device 50 provided on the lower rail 35 of the left rail device 33 is provided on the lower rail 35 of the right rail device 33.

As shown in FIGS. 1 and 2, a striker 80 projects upward from a part of the floor F corresponding to the slot 49 of each coupling device 50. The striker 80 includes a pair of side pillar portions extending upward from the floor F laterally one next to the other, and a cross bar portion extending laterally between the upper ends of the side pillar portions.

As shown in FIG. 2, in the use position of the seat 1, the cross bar portions of the strikers 80 are received in the slots 49 of the respective coupling devices 50, and the upper ends of the slots 49 rest on the cross bar portion via the cushioning members. The outer edge (lower edge) of the latch 54 in the lock position is inclined with respect to the horizontal plane in such a manner that when the striker 80 is pushed into the slot 49, the latch 54 is turned to the release position owing to the pressure from the cross bar portion against the biasing force of the biasing member 64. Once the striker 80 reaches the upper end of the slot 49, the latch 54 returns to the lock position under the biasing force of the biasing member 64 with the result that the striker 80 cannot be removed from the slot 49. When the cable 66 is pulled, the lock piece 63 is pulled away from the latch 54, and the latch 54 is turned from the lock position to the release position by the pulling force applied by the cable 66 via the biasing member 64 so that the striker 80 can be released from the slot 49. In this way, the coupling device 50 is detachably coupled to the striker 80.

The mode of operation of the seat 1 described above is discussed in the following. At the time of a vehicle crash, the seat cushion frame 5 is pulled upward under the inertia force acting thereon. However, the first upper engagement portion 75C and the second upper engagement portion 76C are engaged by the first lower engagement portion 42C and the second lower engagement portion 71B, respectively, so that the inertia load on the seat 1 is transmitted between the seat cushion frame 5 and the coupling device 50 via the first upper engagement member 75, the second upper engagement member 76 and the supporting plate 42. Therefore, the loading on the rail device 33 is minimized, and hence the deformation of the rail device 33 is avoided. Under normal conditions, the first upper engagement portion 75C and the second upper engagement portion 76C are freely moveable relative to the first lower engagement portion 42C and the second lower engagement portion 71B, respectively, when the rail devices 33 are operated as these two parts oppose each other via a gap.

In the illustrated embodiment, because the coupling device 50 is provided laterally next to the associated rail device 33, the vertical distance between the seat surface of the seat cushion 3 and the floor F can be minimized.

In the conventional arrangement, when an upward load is applied to the vehicle seat 1, this load is applied to the rail device 33 but the reaction from the floor F is laterally offset from this loading on the rail device 33. As a result, a twisting moment is applied to the rail device 33, and could cause undesired deformation of the rail device 33. However, in the illustrated embodiment, because the first upper engagement portion 75C, the second upper engagement portion 76C, the first lower engagement portion 42C and the second lower engagement portion 71B are located directly above the coupling device 50, the load acting on the vehicle seat 1 is transmitted vertically and linearly between the seat cushion frame 5 and the coupling device so that the rail device 33 is effectively prevented from deforming.

Because the first upper engagement portion 75C, the second upper engagement portion 76C, the first lower engagement portion 42C and the second lower engagement portion 71B all extend by prescribed lengths in the fore and aft direction, when the rail device 33 is operated, the first upper engagement portion 75C and the second upper engagement portion 76C can be kept opposing the first lower engagement portion 42C and the second lower engagement portion 71B over the entire adjustment stroke of the rail device 33.

Although the present invention has been described in terms of a specific embodiment thereof, these embodiments are merely examples, and the present invention is not limited by these embodiments. For example, two sets of engagement arrangements, one set consisting of the first upper engagement portion 75C and the first lower engagement portion 42C and the other set consisting of the second upper engagement portion 76C and the second lower engagement portion 71B, were used in the foregoing embodiment, but only either one of the two sets may also be used. The additional plate 71 may also be an integral part of the cover plate 52. In other words, the second lower engagement portion 71B may be formed directly in an upper edge of the cover plate 52. In an alternate embodiment, the first lower engagement portion 42C may be formed in an upper edge of the base plate 51 forming a part of the casing 53 of the coupling device 50.

The upper ends of the first upper engagement member 75 and the second upper engagement member 76 may also extend to the upper surfaces of the second intermediate member 16 and the rear member 13 in the fore and aft direction to be engaged by the second intermediate member 16 and the rear member 13. Thereby, the stiffness of the connecting portions between the first upper engagement member 75 and the second upper engagement member 76, and the second intermediate member 16 and the rear member 13 against a downward loading can be improved. Also, it suffices for the purpose of the present invention if the first upper engagement member 75 and the second upper engagement member 76 are engaged by at least two of the front member 12, the rear member 13, the first intermediate member 14 and the second intermediate member 16, instead of the second intermediate member 16 and the rear member 13.

The invention claimed is:

1. A vehicle seat, comprising:
   a skeletal cushion frame for a seat cushion;
   a rail device including an upper rail secured to the cushion frame and extending in a fore and aft direction and a lower rail slidably engaging with the upper rail;
   a coupling device connected to the lower rail via a supporting plate to detachably engage a striker provided on a floor of a vehicle;
   an upper engagement portion secured to a member on a side of the upper rail; and
   a lower engagement portion secured to a member on a side of the lower rail and including a part opposing a corresponding part of the upper engagement portion from above defining a prescribed gap therebetween;
   wherein the coupling device is provided laterally spaced from the rail device, and the upper engagement portion and the lower engagement portion are provided substantially directly above the coupling device.

2. The vehicle seat according to claim 1, wherein the cushion frame comprises a plurality of longitudinal members extending in the fore and aft direction and a plurality of cross members extending laterally between the longitudinal members, and the upper engagement portion is provided in a lower part of an upper engagement member elongated in the fore and aft direction and secured to two of the cross members.

3. The vehicle seat according to claim 2, wherein the supporting plate includes a lower wall attached to a bottom wall of the lower rail and a side wall extending upward from a side edge of the lower wall, and wherein the coupling device is attached to the side wall, and the lower engagement portion is formed in an upper edge of the side wall.

4. The vehicle seat according to claim 3, further comprising an additional plate attached to the supporting plate and having an upper edge laterally spaced from the upper edge of the side wall of the supporting plate, wherein the upper engagement portion is formed on either side of the lower part of the upper engagement member, and the lower engagement portion is formed in each of an upper edge of the supporting plate and an upper edge of the additional plate.

5. The vehicle seat according to claim 4, wherein the additional plate is secured to a cover plate of a casing covering the coupling device.

6. The vehicle seat according to claim 4, wherein the upper engagement member includes a pair of sheet members each including a vertical wall laid over the vertical wall of the other sheet member, and an upper flange bent from an upper edge of the vertical wall away from the other sheet member, the upper engagement portions being formed by upwardly bending lower edges of the vertical walls.

7. The vehicle seat according to claim 6, wherein the vertical walls of the two sheet members are welded to each other.

8. The vehicle seat according to claim 1, wherein the upper engagement portion and the lower engagement portion are elongated in the fore and aft direction.

9. The vehicle seat according to claim 1, wherein each of the upper engagement portion and the lower engagement portion is provided with a shape of letter J in front view.

* * * * *